Figure 1:
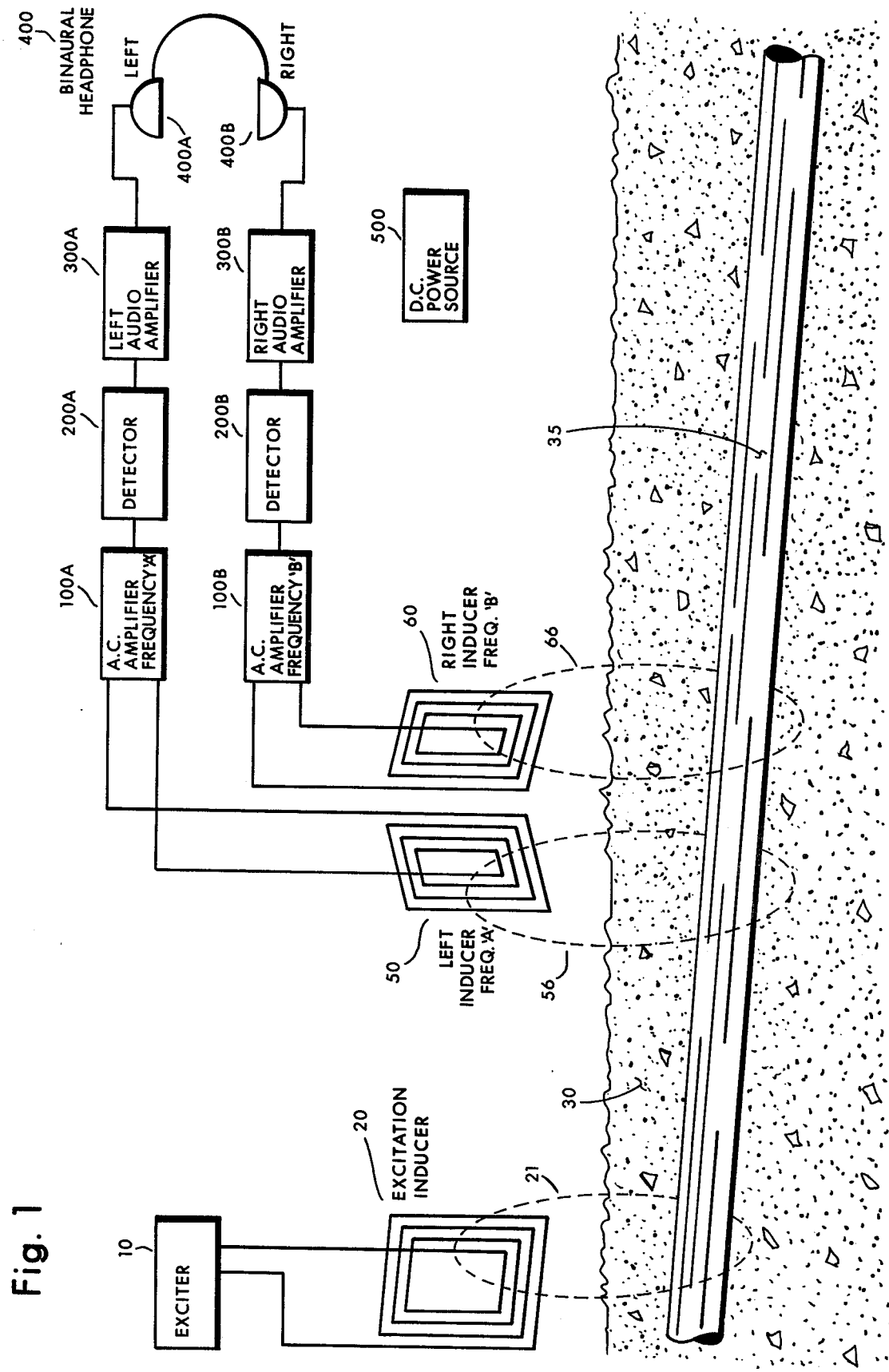

United States Patent [19]

Weber

[11] 4,112,349

[45] Sep. 5, 1978

[54] APPARATUS INCLUDING BIVOLUMETRIC TONE SUBAUDITION MEANS FOR POSITIONALLY SPOTTING AND TRACING SUBJACENTLY CONCEALED CONDUCTIVE STRUCTURES

[76] Inventor: Harold James Weber, 20 Whitney Dr., Sherborn, Mass. 01770

[21] Appl. No.: 795,194

[22] Filed: May 9, 1977

[51] Int. Cl.² ............................................. G01V 3/10
[52] U.S. Cl. ........................................ 324/3; 324/7; 324/67
[58] Field of Search ...................... 324/3, 6, 7, 67, 52; 340/258

[56] References Cited

U.S. PATENT DOCUMENTS

| | | | |
|---|---|---|---|
| 2,731,598 | 1/1956 | Herbert | 324/52 |
| 3,299,351 | 1/1967 | Williams | 324/52 |

*Primary Examiner*—Gerard R. Strecker

[57] ABSTRACT

My new invention describes a method and means for a receptor or translator apparatus suited for positionally spotting and tracing subjacently concealed conductive structures through the detection of a cooperative separately induced pair of radio frequency signals modulated by a constant amplitude radio frequency tone. The pair of radio frequency signals are predeterminately caused to occur either simultaneously or in a sequentially ordered alternative form. The receptor further includes a pair of inducer means in different spatial displacements with each inducer means being operative to be singularly responsive to but one of the pair of radio frequencies emanating from the concealed structure. The independent inducer signals are subsequently amplified and independently demodulated so as to result in two separate audio frequency tones the volume of which are individually proportional to the radio frequency signal level picked up by either of the pair of inducers. The audio tones are then employed to drive independent audio transducers, as for example the individual earphones comprising a binaural headset, for the purpose of conveying to the operator a bivolumetric tone the level inequalities of which are relatively proportional to the displacement error of the pair of inducers in respect to the concealed structure. The result is to provide through means of subaudition an apparent steady or uniform tone volume or loudness when the translator is optimaly aligned about the concealed structure so as to be effectively tracing the lay of the structure.

12 Claims, 5 Drawing Figures

U.S. Patent  Sept. 5, 1978  Sheet 3 of 3  4,112,349

APPARATUS INCLUDING BIVOLUMETRIC TONE SUBAUDITION MEANS FOR POSITIONALLY SPOTTING AND TRACING SUBJACENTLY CONCEALED CONDUCTIVE STRUCTURES

SUMMARY

My new invention relates to improved method and means together with the description of a combination of apparatus which can provide enhanced acuity in the tracing of concealed structures. My invention is novel over prior art in the ability to provide a left or right hand sense of relative tracing error to the operator. The indication for this error sense in my invention is shown by me to be translated to the operator as a bivolumetric, i.e., plural volume component auditory signal resulting in a stereophonic like sensory indication. The operator will, when properly aligned with the concealed structure, receive a nearly identical volume tone from each headphone in a binaural headset the absolute volume of each tone being proportional to the relative electromagnetic field strength intercepted by my new receptor. This intercepted electromagnetic field is caused to emanate from the said concealed structure by a suitably coupled cooperative efficacious electromagnetic field exciter means separate from my new apparatus.

When my new apparatus is moved somewhat to the right of the concealed structure as related to the operator, the operator will receive a bivolumetric indication in his headset with the volume of the tone in one earphone decreasing, while the volume in the other increases. In the particular form of apparatus I have modelled and described in my specification to example my new invention, the tone emanating from the operator's right earphone will decrease in volume, while the tone from the left earphone will increase in volume.

When my new apparatus is moved somewhat to the left of the concealed structure as related to the operator, inverse bivolumetric sensory indication will be provided the operator to that described in the preceding paragraph for the said right hand positional error. For my modelled device this means the tone emanating from the operator's left headphone will descend in volume, while the tone from the right headphone will increase in volume.

My new invention employs the volume characteristic of two audio tones applied individually to each ear of the operator for causing, through subaudition, a sensory perception of direction. This method is related to the natural phenomenon the operator is ordinarily accustomed to wherein the loudest or most voluminous tone or sound is the nearer, while the lessor tone level is more distant. Therefore with merely a little practice the operator will be able to follow and concealed structure with an instinct like deftness through keeping the bivolumetric tone levels nearly equal.

REFERENCE TO DRAWINGS

My disclosure includes three sheets of drawings containing five figures as:

FIG. 1 Functional block diagram of my receptor and how it interacts with the covert structure and the separate exciter means.

Figure 2:
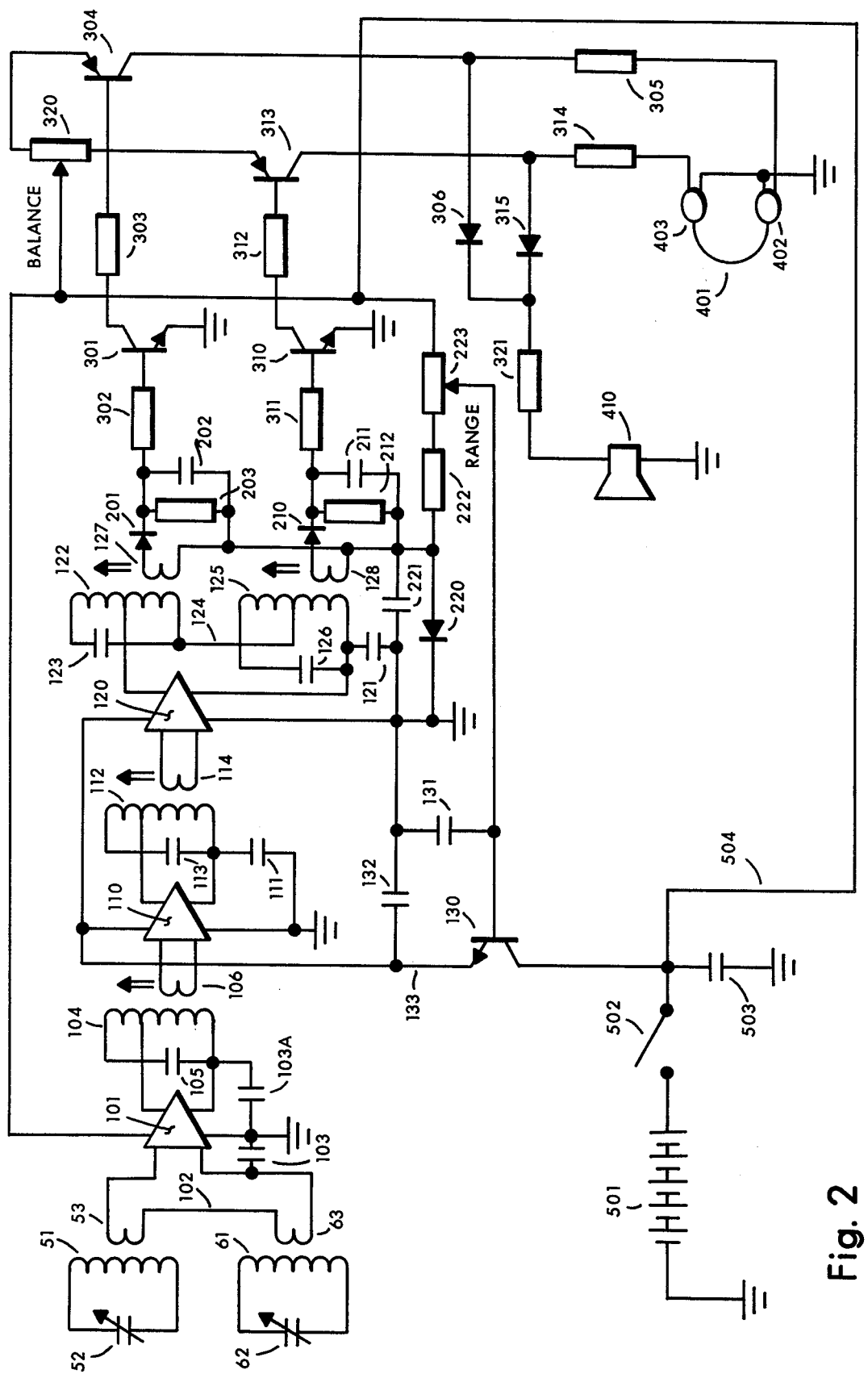

FIG. 2 Schematic diagram for a particular form my receptor may take.

Figure 3:
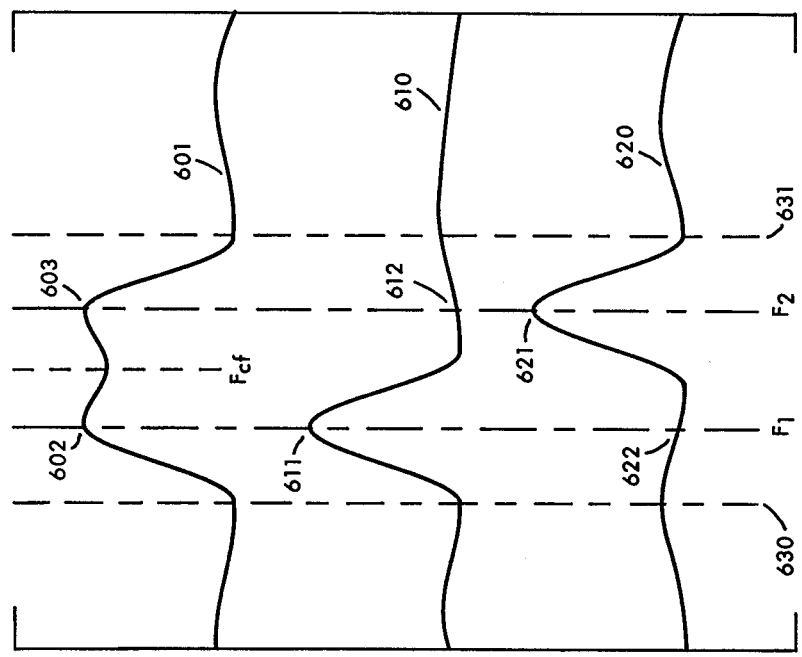

FIG. 3 Waveform representations showing bandpass characteristics for my receptor.

Figure 4:
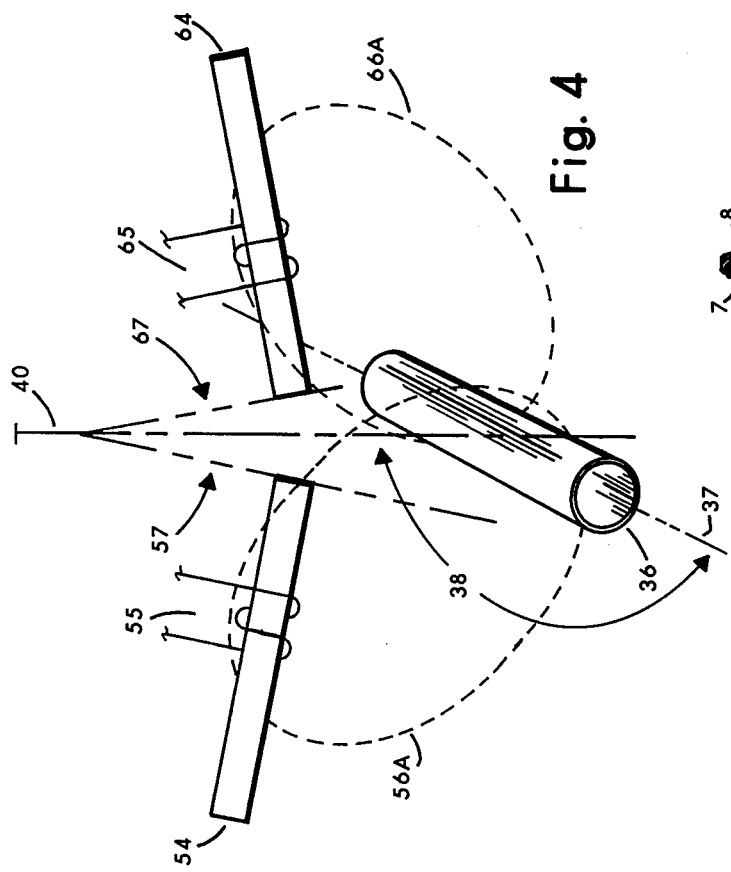

FIG. 4 Diagrammatic representation for the spatial displacement a particular preferred form of my receptor means may take.

Figure 5:
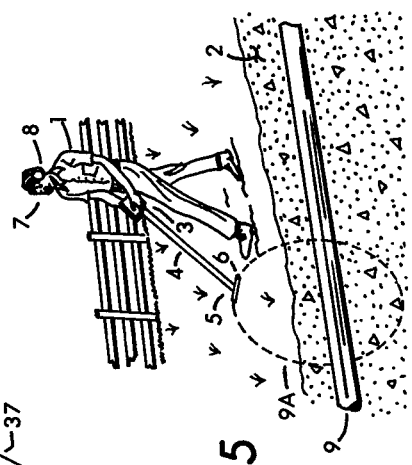

FIG. 5 Pictorial representation of how my receptor may be used for tracing a concealed pipe.

FIG. 1 is a block diagram showing my new invention. The purpose is to provide a translator means with improved acuity for locating and tracing a more conductive concealed structure 35 is a less conductive covert medium 30, said conductive structure having been caused to emanate at least two audio frequency tone modulated simultaneous or alternative higher frequency signal fields at, say, distinctly different higher frequency "A" and higher frequency "B" sympathetically induced by a separate efficacious exciter means 10 and excitation inducer 20 coupled to said structure 35 by means of mutual coupling field lines 21.

My new invention includes a plural inducer pickup means consisting of, at least, say, a left inducer 50 and, say, a right inducer 60 coupled by field lines 56 and 66 respectively to the hidden structure 35. The said plural inducers 50, 60 are further caused to be located in at least two slightly different offset positions. The said inducers are each operative to produce a minute alternating current voltage proportional to the respective electromagnetic induction field they each intercept from the concealed structure 35. The inducers are each caused to be principally responsive to only one of the said distinctly different plural exciter frequencies, say, "A" and "B".

The resulting minute voltage produced by each said singularly responsive inducer is amplified by A.C. amplifier means 100A for frequency "A" and by A.C. amplifier means 100B for frequency "B". The resulting amplified signal provided by the said A.C. amplifier means 100A, 100B is rectified by respective detector means 200A, 200B. The output signal from the said detector means 200A, 200B is amplified by audio amplifier means 300A, 300B and subsequently serves to drive binaural headphone 400, phasing being such that the signal originally derived from the left inducer 50 serves to drive the left earphone 400A, while the signal originally derived from the right inducer 60 serves to drive the right earphone 400B. A source of power 500 provides the necessary operating potentials for the active amplifying elements in the said translator.

The result is that, when the signal field arriving at each inducer 50, 60 is about the same, the audio tone produced by each respective earphone 400A, 400B in the said binaural headphone 400 is also similiar in amplitude resulting in an apparent steady tone loudness sensation of balanced, nearly equal, volume to the operator.

On the otherhand, if the position of the translator is such that one inducer receives more signal than the other from the concealed structure, the result will be that the operator will receive a stronger signal from one earphone than the other resulting in a distinctive two level tone modulation for the operator. The operator will, with a little practice, be able to intuitively deduce the direction in which to move the inducers so as to keep them aligned with and over the concealed structure, thus tracing the lay of the concealed structure with high accuracy.

FIG. 2 shows the schematic for a preferred embodiment which my new invention has assumed. Left inducer 51 is resonated at frequency "A" by capacitance 52, while right inducer 61 is resonated at frequency "B" by capacitance 62. Ths signals induced in either said inducer 51, 61 are coupled by coupling means 53, 63 which are mutually coupled by juncture 102. The result is the two inducers, since they operate at distinctly different frequencies "A" and "B", can be coupled into and caused to be amplified by a common amplifier means.

The said common amplifier means consists of gain device, or integrated circuit 101 together with bypass capacitance 103 coupled into a resonant transformer 104, brought to resonance by capacitance 105. The transformer secondary 106 couples to gain device 110, together with bypass capacitance 111. The output of the gain device couples to resonant transformer 112, together with resonating capacitance 113.

The transformer secondary 114 couples to gain stage 120. The output of this stage differs in that in couples into two resonant transformers 122, 125 together with respective resonant capacitance 123, 126. Transformer 122 is caused to be singularly resonant at frequency "A", while transformer 125 is caused to be singularly resonant at frequency "B".

Transformer 122 is coupled by coupling means 127 to rectifier, or detector means 201 together with detector load resistance 203 and radio frequency filter capacitance 202. The resultant detected audio signal couples by resistor 302 into gain device, or transistor 301 which is subsequently caused to drive second audio frequency gain device transistor 304 through resistance 303. The collector of transistor 304 serves to drive left earphone 402 through limiting resistance 305.

Transformer 125 is coupled by coupling means 128 to rectifier, or detector means 210 together with detector load resistance 212 and r.f. filter capacitance 211. The resultant detected audio signal couples by resistor 311 into gain device, or transistor 310 which is subsequently caused to drive second audio frequency gain device 313 through resistance 312. The collector of transistor 313 serves to drive right earphone 403 through limiting resistance 314.

The result is the earphone 402 comprising part of the headset 401 will reproduce an audio frequency tone or signal the volume of which is proportional to the radio frequency field intensity intercepted by inducer 51. In a like manner the earphone 403 will reproduce an audio frequency tone or signal the volume of which is proportional to the radio frequency field intensity intercepted by inducer 61. The relative amplitude of the individual headsets can be compensated for by balance potentiometer 320 for best operator interaction.

My invention also shows the use of an audio reproducer, or loudspeaker means 410 which may be used to reproduce the incoming signal in lieu of or in combination with the said headset 401. The loudspeaker 410 is driven through steering diodes 306, 315 through volume limiting resistance 321. The result is an audio indication providing relative indication of incoming field strengths but lacking the stereophonic like effect provided the operator when using the headset 401.

The gain of my translator means is adjustable by a RANGE potentiometer 223 which controls the base voltage on emitter follower, or pass transistor 130. The variable output of the said emitter follower provides operating voltage for gain stages 110, 120 and includes bypass capacitor 132. The result is effective gain control of the A.C. amplifier means.

The range potentiometer 223 is series connected with resistance 222 and prebias diode 220. The purpose of the said prebias diode is to establish about a 0.7 volt level at the juncture of detector load resistance 203, 212 so as to convey through the said load resistance and base resistor 302, 311 a prebias voltage nearly equal to, but measurably less than, the base/emitter junction drop for amplifier transistors 301, 310. The effect is to increase the sensitivity of the amplifier by establishing the operating conditions at near turn-on, but still enabling the amplifying transistors 301, 304, 310, 313 to operate in a more efficient manner than would be provided by more conventional Class A bias schemes, thus conserving portable battery power.

A combination of electrochemical cell apparatus operative to produce a united electrical effect, or battery means 501 is employed in conjunction with switch means 502 and A.C. bypass capacitor means 503 to provide on line 504 the voltage and current necessary for the proper operation of the aforesaid various amplifying means devices.

FIG. 3 includes diagrammatic response curves for my translator. The upper curve 601 represents the desired response for the A.C. amplifier means and in particular the response for the interstage transformers 104, 112. Peak 602 is caused to occur at the "A" frequency, while peak 603 is caused to occur at the "B" frequency. In my modelled apparatus, frequency "A" is 438.88 kilohertz, while frequency "B" is 446.29 kilohertz, although any other similiarly related pair of frequencies ought to work equally as well.

The middle curve 610 represents the response for the left inducer 51 and the left channel interstage transformer 122. Peak 611 is caused in this example to occur at frequency "A", while the response 612 to frequency "B" is at a minimum.

Conversely, the lower curve 620 represents the response for the right inducer 61 and the right channel interstage transformer 125. Peak 621 is caused in this example to occur at frequency "B", while the response 622 to frequency "A" is at a minimum.

In my shown example and in my model, $F_1$ is frequency "A", $F_2$ is frequency "B", while the center or midband frequency $F_{cf}$ is:

$$F_{cf} = (F_1 + F_2)/2$$

The lower out-of-band frequency 630 and the upper out-of-band frequency 631 show the skirt selectivity responses for the curves 601, 610, 620. The nearer the out-of-band frequencies 630, 631 are to the center frequency $F_{cf}$, the better the responsivity of my new invention will be to weak signals for the net effective bandwidth will be less allowing an increase in electronic gain before extraneous noise becomes overwhelming. This objective is best attained by maximizing the operating "Q" of the inducers 51, 61 and the output interstage transformers 122, 125.

FIG. 4 is a diagrammatic representation of the inducers associated with my translator and how they interact with a covert structure.

The hidden structure 36 shown as a pipe or like object typically buried in a covert medium. Two inducers consisting of core means 54, 64 and resonant winding 55, 65 are oriented above and optimally arranged such that the axis of the said inducers 54, 64 are perpendicular to the axis 37 of the structure 36. My figure further shows that if an imaginary line 40 is extended at a right angle, or ninty degrees from the axis 37 of the buried structure, there is a definite improvement in resolution of my inducer means if my individual inducers 54, 64 are at slight angular displacement 57, 67 of ten to twenty degrees with respect to the extended line 40. The effect is to cause the individual inducers 54, 64 to go through a more pronounced region of transistion wherein they are in fact properly oriented with respect to the buried object. With this offset displacement, the condition of some error in angular displacement will always occur and what the translator seeks is a condition where the error is similiar and of course minimum for each inducer. This is a condition of particular value for tracing structures of larger sizes.

FIG. 5 is an illustration of one particular portable form for my translator and how it might be employed for tracing a buried pipe 9. The operator 1 traverses the ground 2 carrying the translator 3 which includes a short staff 4 the other end of which supports my right inducer 5 and left inducer 6. The said inducers couple to the field lines 9A emanating from the buried pipe 9. The result is a response in right headset 7 and left headset 8 relative to the position of the said inducers 5, 6 in respect to the buried pipe 9.

While my invention is shown to use two inducers in close proximity, this shall not prevent the scope of my new invention from including any plurality of inducers on any number of axis be they at differing angles or not so long as the intent of my invention is met, that intent being to receive the field lines in such a way from the concealed structure so as to sense position thereof.

While my new invention has been shown to use particular types of integrated circuits function and gain devices, a person skilled in the art could duplicate the same function from built up circuits consisting of individual components arranged in a multitude of combinations, or with other combinations of integrated circuit gain devices.

While my A.C. amplifier is shown to employ a straight amplifier, or more specifically a class of amplifier commonly referred to as a tuned radio frequency amplifier, this shall not serve to restrict my new invention to this kind of said amplifier but shall include superhetrodyne or regenerative amplifying means, or any method known to those skilled in the art suited for the purpose of the said A.C. amplifier means.

Although I show an exampled operating frequency in the vicinity of 440 kilohertz, this shall not be construed as in any way limiting my new apparatus from operation at any other frequency as may be suitable in the electromagnetic spectrum.

The elements comprising my said translator when properly coupled to each other as in FIG. 2 form a compact package which can principally be contained upon a printed circuit board or like support means within a protective housing. My model which operates successfully and is herein described utilizes the following key components and component values:

| | |
|---|---|
| inducer 51, 61 | 900 microhenry |
| capacitor 52, 62 | 150 picofarad (approx.) |
| integrated circuit 101, 110, 120 | uA-703 |
| NPN transistor 130, 301, 310 | 2N4123 |
| PNP transistor 304, 313 | 2N4125 |
| diode 201, 210 | 1N64A |
| diode 220 | 1N914 |
| diode 306, 315 | 1N4001 |
| resonant transformer 104,112,122,125 | tuned transformer |
| capacitor 103,103A,111,121,132,221 | 200 nanofarad, 20 volt |
| capacitor 202, 211 | 2 nanofarad, 50 volt |
| capacitor 131 | 10 nanofarad, 50 volt |
| capacitor 503 | 10 microfarad, 16 volt |
| resistor 203, 212, 302, 311 | 6,800 ohms |
| resistor 222 | 4,700 ohms |
| resistor 303, 312 | 2,200 ohms |
| resistor 305, 314 | 47 ohms |

-continued

| | |
|---|---|
| resistor 321 | 27 ohms |
| potentiometer 223 | 5,000 ohms |
| potentiometer 320 | 500 ohms |
| binaural headset 401 | 8/16 ohms |
| loudspeaker 410 | 10 ohms |
| battery 501 | 12 volts |
| switch 502 | S.P.S.T. |

The foregoing parameters and values are given by way of example only to assist a person of average skill to duplicate a model of my invention for experimental purposes and are not intended to limit in any way the scope of my invention.

My invention is shown as a buried cable or pipe locating receptor apparatus. This example shall not limit the scope of my invention, but shall also include applications for tracing structural members as for example reinforcement rods in concrete, wires in walls, underwater concealments traced from a shipboard receptor, or concealments such as a pipeline traced by trailing my apparatus from a flying machine, or any other such like applications as will occur to those skilled in the art.

What I claim for my new invention is:

1. A receptor apparatus wherein the utility lies as a means for providing improved acuity and sense of relative, say, right or left hand, perceptibility as to the lay of a concealed structure through the novel use of a plurality of separate position indicative sensory indications to an operator, said receptor including in operative combination;

a. Plural inducer means arranged in a noncoincident relationship for the interception of electromagnetic field lines of various magnitudes produced sympathetically in the said concealed structure by separate exciter means, said exciter means operative to provide at least two distinctly different higher frequency alternating current signals each of which is modulated in amplitude at an audio frequency rate, wherein each of said plural inducer means is responsive to a different one of the said distinctly different frequencies so as to provide minute alternating current levels proportional to the relative power of the said electromagnetic induction field lines at the respective frequency intercepted by each of the said plural inducers, b. A.C. amplifier means, with plural inputs connected to said plural inducer means, operative to independently amplify said minute alternating current levels produced by each of the operatively connected plural inducer means to provide plural different frequency output signals of increased amplitude, each of said different frequency output signals being proportional to each of the respective plural minute alternating current level AC amplifier inputs, c. a plurality of detector means, each operative to detect a respective one of the different frequency plural A.C. amplifier output signals from the operatively connected A.C. amplifier means for producing plural audio signal outputs from said detector means, each audio signal output being proportional in amplitude to a respective one of the said minute alternating current level inputs, d. Audio amplifier means coupled to the output of each of the detector means operative to independently amplify each of the said plural audio signal outputs derived from said detector means, e. Audio reproducer means comprising a plurality of separate transducers with at least one of said transducers coupled to each of the said audio amplifier means to provide at least two audio tone sensations for the operator consisting of at least a left ear signal and a right ear signal the respective volumes of which are individually proportional to a respective one of the said plural audio signal inputs to the reproducer means, f. D.C. power source operative connected to each the said A.C. amplifier means, detector means, and audio amplifier means.

2. The receptor as in claim 1 wherein the said plural inducer means principally consists of a pair of inducers located along a common axis in two slightly offset positions.

3. The receptor as in claim 1 wherein the said plural inducer means principally consists of a pair of inducers with their respective axis arranged at slight angular displacement.

4. The receptor as in claim 1 wherein each of the said plural inducers is operative at a distinctively different frequency.

5. The receptor as in claim 1 wherein the said A.C. amplifier means consists of a common amplifier circuit with at least two inputs and at least two outputs arranged so as to selectively provide for the independent amplification of each inducer signal frequency.

6. The receptor as in claim 1 wherein the said detector means provides for the independent rectification of each of the said A.C. amplifier outputs.

7. The receptor as in claim 1 wherein the said audio reproducer means consists of two earphones arranged as a binaural headset with independent earphone connection for the operator's left and right ear.

8. The receptor as in claim 1 wherein the said audio reproducer means consists of a loudspeaker coupled through steering diodes from the plural audio amplifier outputs for the purpose such as to provide a composite acoustical output signal.

9. The receptor as in claim 1 wherein the said D.C. power source consists of a combination of electrochemical cell apparatus operative to produce a united electrical effect.

10. The receptor as in claim 1 contained in a portable physical form suited for the spotting and tracing of subjacently concealed conductive structures, said form consisting of a short staff one end of which supports at least two inducers whilst the contrapositive end supports a housing which principally contains the operative circuit means, control means, battery means, and a transportive grip means.

11. The receptor as in claim 1 wherein the said audio amplifier comprises a transistor device and is provided with a prebias voltage nearly equal to, but measurably less than, the base to emitter junction voltage drop for the said transistor thereby providing a more efficient operating manner and conserving portable battery power.

12. The receptor as in claim 1 wherein the said audio amplifier means includes a balance control operative to adjust the ratio of the relative level of the left signal and the right signal so as to permit compensation for operators with different ear sensitivities.

* * * * *